Patented Nov. 2, 1943

2,333,486

UNITED STATES PATENT OFFICE 2,333,486

ESTROGENIC AGENTS

Edmond E. Moore, Waukegan, Ill., assignor to Abbott Laboratories, North Chicago, Ill., a corporation of Illinois No Drawing. Application January 11, 1941, Serial No. 374,090

6 Claims. (Cl. 260—619)

The present invention relates to therapeutic compositions and more particularly to new compositions having potent estrogenic action.

Various stilbestrol (4,4'-stilbenediol) compounds have been prepared heretofore having varying estrogenic activity. One of these compounds α, α'-diethylstilbestrol (Dodds, Proc. Roy. Soc. 127:140–167 (1939)) has been found to possess high activity. Other compounds such as the α-n-butylstilbestrol have been found to possess substantially no or relatively low activity.

The principal object of the present invention is to provide the art with new and improved compounds of extremely high estrogenic activity.

Other objects will be apparent as the description hereinafter proceeds.

I have discovered after a prolonged and difficult research investigation improved estrogenic agents of the type desired for estrogenic therapy. These agents, upon which the present invention is predicated, are stilbestrols characterized by the presence of α-methyl, α'-3 carbon hydrocarbon groups. Their formula characterized by the novel combination of "α, α'" groups may be represented as follows:

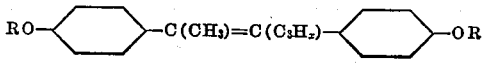

where R is hydrogen or methyl and where $x$ is 5 or 7.

The following examples will serve to illustrate processes of preparing the compositions of the present invention.

EXAMPLE I

α-METHYL-α'-PROPENYL-STILBESTROL (a) α-*Methyl-α'-2-propenyl-4,4'dimethoxy-stilbene*

About 3.65 grams of magnesium, about 13.5 grams of α-methyldesoxyanisoin and about 75 c. c. of dry ether with a few drops of methyl iodide are first mixed and heated together. To this mixture is next added a solution of about 30.25 grams of 2-propenyl bromide ($CH_2=CH-CH_2Br$) in 200 c.c. of ether. The resulting solution is next refluxed for about two hours, then poured on ice and acidified with dilute sulfuric acid. The ether layer is next separated, washed free of acid and dried over sodium sulfate in accordance with known practices. After drying the ether is removed in the usual manner leaving the residue.

The residue obtained in addition to the stilbene derivative ordinarily also contains some carbinol derivative which may be converted into the desired stilbene derivative by treating with phosphorus tribromide as follows. About 11 grams of the above residue is first dissolved in about 20 cc. of chloroform. A second solution is next prepared by dissolving about 9.5 grams of phosphorus tribromide in about 15 c. c. of chloroform. The solutions, after cooling, are then mixed together, allowed to stand (e. g. over night), cooled and poured into cold alcohol. The alcoholic solution is next poured into water, the chloroform layer separated and dried with calcium chloride in accordance with usual practices. The chloroform is then removed and the residue distilled at about 195°–200° C. under 2 mm. pressure.

On standing solid α-methyl-α'-2-propenyl 4,4' dimethoxystilbene is formed as the distilled residue partly solidified. On further standing, more of the solid is formed. The solid product upon recrystallization from petroleum ether has a melting point of about 98°–99° C.

Investigations indicate that the distilled residue originally contains a mixture of isomers and that the quantity of the more stable isomer increases at the expense of the others. In addition to the trans and cis isomers illustrated by Formulas I and II below it is possible that some of the carbinol derivative dehydrates to yield another type of isomer illustrated by Formula III below.

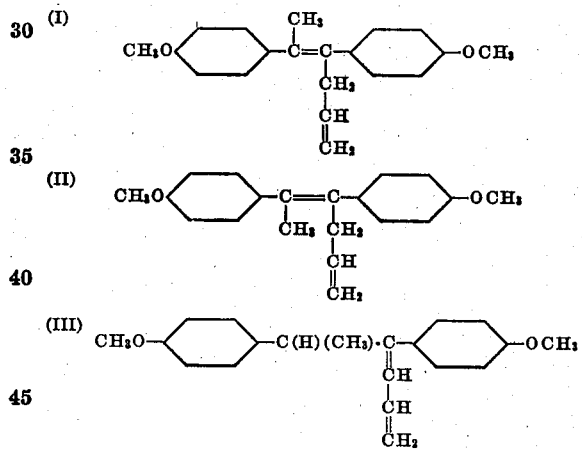

In order to speed up the formation of the most stable isomer (believed to be the form illustrated by Formula I above) the residual oil from the distilled residue is dissolved in a carbon tetrachloride solution of iodine and refluxed for about an hour. The iodine and carbon tetrachloride are then distilled off and a little alcohol added to the residue. In a few minutes crystals of the solid isomer are formed, melting at about 98°–99° C.

(b) α-Methyl-α'-2-propenyl-stilbestrol

About 4 grams of α-methyl-α'-2-propenyl-4,4' dimethoxy-stilbene prepared, for example, as described above are first added to a solution of 15 grams of potassium hydroxide in 80 c. c. of ethyl alcohol. The resulting suspension is next placed in a bomb which is closed and heated for about 20 hours at around 210° C. The bomb is then cooled, the reaction mixture poured into 300 c. c. of water and about 120 c. c. distilled off to remove the alcohol. The remaining solution is cooled, extracted with ether to remove any unchanged starting material and is then filtered. The residual ether is next removed from the filtered aqueous solution by heat and dilute hydrochloric acid added to precipitate the desired stilbestrol. The precipitate obtained after drying may be purified by recrystallization from a solvent such as benzene to yield substantially pure α-methyl-α'-2-propenyl-stilbestrol melting at about 158° C.

(The exact configuration of the above compound is somewhat uncertain as it has been ascertained that in certain cases 2-or Δ₂ propenyl (allyl) groups (CH₂=CH—CH₂) adjacent to active groups are converted into 1-or Δ₁ propenyl groups (CH₃—CH=CH—) in the presence of alcoholic alkalies. Thus it is possible in process step (b) above that the double bond shifts in the 2-propenyl group during demethylation to form a 1-propenyl group. In such cases the final product would be α-methyl-α'-1-propenyl-stilbestrol.)

EXAMPLE II.—α-METHYL-α'-N-PROPYL-STILBESTROL

This product may be prepared in accordance with the general process of Example I by reacting α-methyl-desoxyanison with n-propyl magnesium bromide, dehydrating the carbinol with phosphorus bromide, isomerizing with the iodine-carbon tetrachloride solution and subjecting the α-methyl-α'-n-propyl-4,4'-dimethoxystilbene reaction mixture to demethylation in an alcoholic potassium hydroxide reaction solution. The α-methyl-α'-n-propylstilbestrol product obtained melts at about 131°–132° C.

EXAMPLE III.—α-METHYL-α'-ISOPROPYL-STILBESTROL

This product may be prepared in accordance with the processes of Examples I or II using as the Grignard agent isopropyl magnesium bromide. The α-methyl-α'-isopropyl-stilbestrol product obtained melts at about 158° C.

The compounds of the present invention including their methoxy intermediates have excellent estrogenic action. The demethylated products, however, due to their extremely high activity are preferred for commercial use.

Isomerism to the stable isomer may, if desired, be carried out with various isomerizing chemicals or by light. However, for the compounds of the present invention characterized by a methyl group attached to one ethylenic carbon and a three carbon hydrocarbon group attached to the other ethylenic carbon the use of the described carbon tetrachloride solution of iodine is ordinarily preferred.

It will be understood that the present invention is not limited to the above illustrative examples. All modifications coming within the scope of the present invention are intended to be covered by the following claims.

I claim:

1. Compounds represented by the following formula:

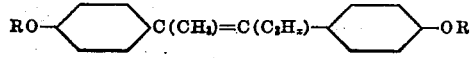

where R is selected from the group consisting of hydrogen and the methyl group and where x is selected from the group consisting of 5 and 7.

2. α-methyl-α'-n-propylstilbestrol.
3. α-methyl-α'-isopropylstilbestrol.
4. α-methyl-α'-propenyl-stilbestrol.
5. α-methyl-α'-2-propenyl-stilbestrol.
6. Stilbestrol estrogenic agents of 4,4'-stilbenediol characterized by a methyl group attached to one ethylenic carbon atom and a three carbon hydrocarbon group attached to the other ethylenic carbon atom.

EDMOND E. MOORE.